UNITED STATES PATENT OFFICE.

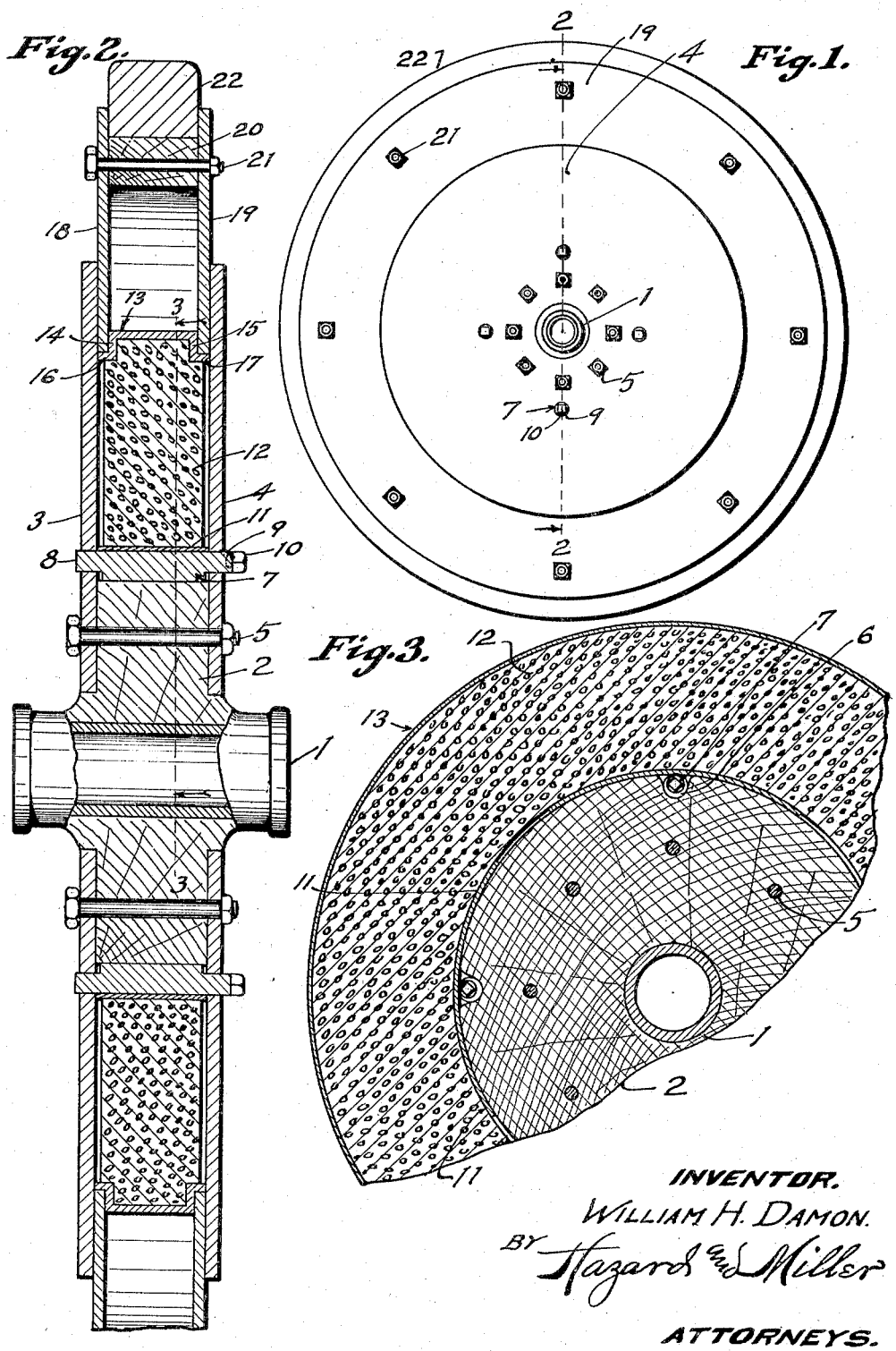

WILLIAM H. DAMON, OF LOS ANGELES, CALIFORNIA.

RUBBER-CUSHION WHEEL.

1,325,833.      Specification of Letters Patent.     Patented Dec. 23, 1919.

Application filed February 8, 1919. Serial No. 275,887.

*To all whom it may concern:*

Be it known that I, WILLIAM H. DAMON, a citizen of the United States, residing at Los Angeles, in the county of Los Angeles and State of California, have invented new and useful Improvements in Rubber-Cushion Wheels, of which the following is a specification.

My object is to make a rubber cushion wheel and my invention consists of the novel features herein shown, described and claimed.

Specifically my object is to make a wheel having a hard rubber tire and an annular body of soft rubber to serve the purpose of a pneumatic tire.

Figure 1 is a side elevation of a rubber cushion wheel embodying the principles of my invention.

Fig. 2 is a diametrical sectional detail upon an enlarged scale and on the line 2—2 of Fig. 1.

Fig. 3 is a fragmentary sectional detail on the same plane as Fig. 1 and on the line 3—3 of Fig. 2.

An axle skein 1 may be any of the usual constructions and an annular flange 2 projects outwardly from the periphery of the skein or hub. Annular housing plates 3 and 4 fit against the flange 2 concentric to the skein or hub 1 and are secured in place by bolts 5 inserted through the plates and through the flange 2 to clamp the plates in parallel position tightly against the flange. Recesses 6 are formed in the periphery of the flange 2 parallel with the axis and evenly spaced apart. Eccentrics 7 are mounted in the recesses 6 and have pintles 8 and 9 extending through the plates 3 and 4, there being wrench seats 10 upon the pintles 9 outside of the plate 4. Segmental bearing plates 11 are placed against the eccentrics 7 and against the periphery of the flange 2. An annular soft rubber cushion 12 fits tightly around the segmental plates 11 and loosely between the housing plates 3 and 4. The rubber cushion 12 may be tightened and held against circular movement upon the flange 2 by applying a wrench to the wrench seats 10 and turning the eccentrics 7 to press the plates 11 outwardly against the inner face of the cushion 12. An annular bearing plate comprising a central web 13, supporting webs 14 and 15, and the supporting flanges 16 and 17, fits tightly upon the periphery of the cushion 12 and slides between the housing plates 3 and 4. Annular extension housing plates 18 and 19 fit against the sides of a felly 20 and are clamped in place by bolts 21. The felly 20 spaces the extension housing plates 18 and 19 the proper distance apart to fit slidingly between the housing plates 3 and 4 and to rest upon the outer faces of the flanges 16 and 17 so that the extension housing plates 18 and 19 are held yieldingly in concentric positions relative to the axis of the wheel by the tension of the rubber cushion 12. A hard rubber tire 22 fits tightly upon the periphery of the felly 20 between the outer edges of the extension housing plates 18 and 19.

It is intended that the cushion 12 shall be good Para rubber and that the cushion shall fit loose enough between the housing plates 3 and 4 so that when the cushion is pressed radially by the load it may expand sidewise.

In the practical operation the cushion 12 forms a yielding support between the hard rubber tire 22 and the hub 1 and serves the purpose of a pneumatic tire. The wheel thus constructed is comparatively cheap, made of few parts, easily constructed, is easily assembled and disassembled and will make a good substitute for a wheel carrying a pneumatic tire or for a spring wheel.

Various changes may be made without departing from the spirit of my invention as claimed.

I claim:

1. A rubber cushion wheel comprising a hub having an annular flange, annular housing plates clamped against the sides of the flange, an expandible ring fitted against the periphery of the flange, an annular soft rubber cushion fitting tightly upon the annular ring, an annular bearing plate fitting to the periphery of the rubber cushion, extension housing plates slidably mounted between the first housing plates and against the annular bearing plate, a rim mounted between the extension housing plates, and means for increasing the diameter of the annular expandible ring.

2. A rubber cushion wheel comprising a hub having an annular flange provided with transverse recesses in its periphery; annular housing plates clamped against the sides of the flange; eccentrics mounted in the recesses and having pintles extending through the housing plates and wrench seats outside of the housing plates; segmental bearing plates fitting against the periphery of the flange and against the eccentrics; an annular soft rubber cushion fitting tightly upon the segmental plates; an annular bearing plate fitting tightly upon the periphery of the soft rubber cushion; extension housing plates slidingly mounted between the first housing plates against the annular bearing plate; and means forming a wheel rim at the outer edges of the extension housing plates.

In testimony whereof I have signed my name to this specification.

WILLIAM H. DAMON.